Sept. 10, 1940.  G. N. EDWARDS  2,214,048
ANTENNA FOR MOTOR VEHICLES
Filed Sept. 6, 1934
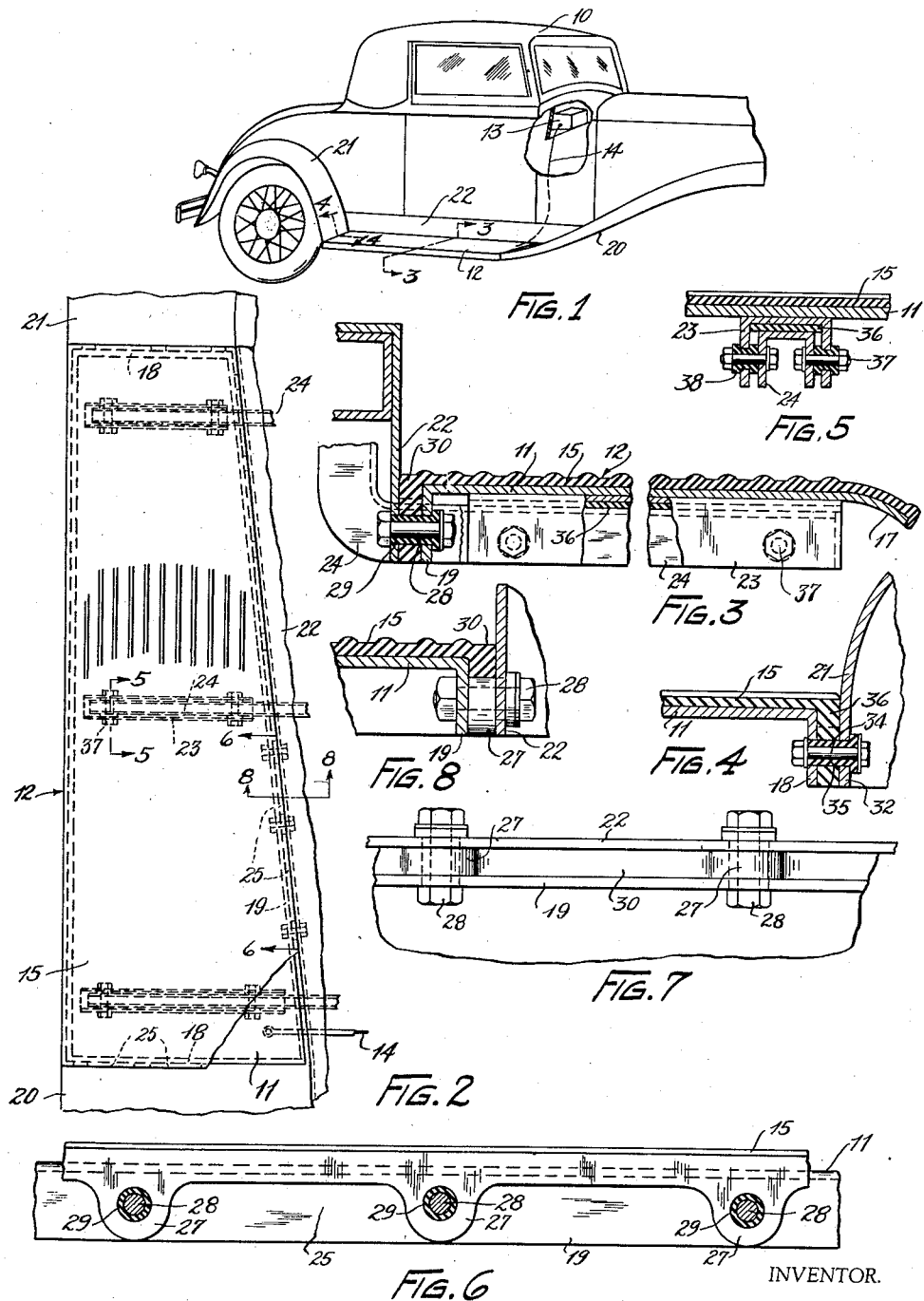
INVENTOR.
GEORGE N. EDWARDS
BY
Kwis, Hudson & Kent.
ATTORNEYS Patented Sept. 10, 1940

2,214,048

UNITED STATES PATENT OFFICE 2,214,048

ANTENNA FOR MOTOR VEHICLES

George N. Edwards, Willoughby, Ohio, assignor to The Ohio Rubber Company, Willoughby, Ohio, a corporation of Ohio Application September 6, 1934, Serial No. 742,951

10 Claims. (Cl. 250—33)

This invention relates to radio antennas, and more particularly to an improved form of motor vehicle antenna of the type wherein a metallic part of the vehicle structure is insulated from adjacent vehicle structure to form the antenna.

An object of the invention is to provide an antenna, of the type referred to, wherein a novel insulating arrangement isolates the metallic vehicle part from adjacent vehicle structure to form the antenna.

Another object of the invention is to provide an improved vehicle antenna, of the type referred to, wherein the metallic vehicle part which forms the antenna is connected with the vehicle with an insulating air space between such part and the adjacent vehicle structure.

A further object of the invention is to provide a novel antenna arrangement for a motor vehicle wherein the metal body of a running board is connected to the vehicle with an insulating air space between the metal body and the adjacent vehicle structure, and wherein portions of a rubber tread of the running board extend between the body and the adjacent vehicle structure as spacers.

The present invention is an improvement over the radio antenna disclosed in co-pending application Serial No. 731,478, filed June 20, 1934.

Other objects and advantages of the invention will be apparent from the following description, when taken in conjunction with the accompanying sheet of drawings wherein:

Fig. 1 is a partial perspective view of a vehicle to which my improved radio antenna has been applied.

Fig. 2 is a plan view of the running board showing its connections with the vehicle structure.

Fig. 3 is a transverse sectional view of the running board taken as indicated by line 3—3 of Fig. 1.

Fig. 4 is a partial sectional view taken on line 4—4 of Fig. 1.

Fig. 5 is a sectional view taken through the running board and one of its supporting brackets as indicated by line 5—5 of Fig. 2.

Fig. 6 is a partial sectional view taken on line 6—6 of Fig. 2.

Fig. 7 is a partial bottom plan view of the connection formed at one of the running board flanges, and Fig. 8 is a partial sectional view taken through the running board and adjacent vehicle structure at a point between clamping bolts, as indicated by line 8—8 of Fig. 2.

In the accompanying drawing, to which detailed reference will presently be made, I have shown an improved radio antenna of the type wherein a metallic part of the vehicle structure, such as a running board body, is insulated from adjacent vehicle structure to form the antenna. It will be understood, of course, that the arrangements shown in the drawing are for purposes of illustration only and that the invention may be embodied in various other constructions.

The co-pending application referred to above discloses the use of the metal body of a vehicle running board as a radio antenna, the metal body of the running board being insulated by extending the rubber tread of the running board between the connecting flanges of the running board body and the adjacent vehicle structure, and also by the use of rubber gaskets between the running board body and the brackets to which the running board is attached. With the running board body insulated from the vehicle structure in this manner I have found that more or less leakage of electricity takes place between the metal running board body and the vehicle structure which reduces the efficiency of the running board body as a radio antenna. According to the present invention, as will be explained more fully hereinafter, the metal running board body is insulated from adjacent vehicle structure largely by an air space made available by a novel arrangement of running board structure and connecting means.

In Fig. 1 of the drawing I have shown a motor vehicle 10 to which my improved radio antenna has been applied, the antenna being formed by the metal body 11 of the running board 12. I have shown the vehicle as being equipped with a radio apparatus 13, such as a broadcast receiving set of the type now commercially available. The radio set may be mounted in any convenient part of the vehicle, such as in front of the instrument panel, and has an insulated lead-in wire 14 which is connected to the metal body of the running board.

Vehicle running boards of the type having a metallic body, such as a body stamped from sheet metal, have been commonly used heretofore in automobile construction. Running boards have also been used heretofore which have a metallic body of this kind with a rubber tread or covering secured thereto, either by mechanical fastening means or by the rubber being vulcanized or bonded to the surface of the metal body. The running board 12 shown in this instance is a running board of the type just mentioned and, as shown in the drawing, comprises the metal body 11 and a rubber tread or covering 15 secured thereto. As usual in running boards of this type, the metal body 11 may be provided with a down-turned front flange 17 and with depending end and rear flanges 18 and 19. The end flanges 18 provide a means for connecting the ends of the running board with the front and rear fenders 20 and 21 of the vehicle, and the rear flange 19 provides a means for connecting the running board with the splash pan 22. In addition to the connecting flanges just referred to, the metal body of the running board may also be provided with one or more metal clips 23 on the under side thereof for cooperation with supporting brackets 24 which are supported on the chassis and extend laterally outwardly therefrom beneath the running board as shown in Figs. 2 and 3.

According to the novel insulating arrangement of the present invention, the running board is connected to the vehicle with the end and rear flanges 18 and 19 of the metal body spaced away from the adjacent parts of the vehicle so as to leave insulating air spaces 25 therebetween. In Figs. 2 and 3 of the drawing I show the running board connected to the vehicle with the depending rear flange 19 of the running board body extending along in spaced relation to the splash pan 22. The proper spacing between the flange 19 and the splash pan 22 to provide the insulating air spaces 25 of correct width, may be determined and maintained by the use of suitable insulating spacers. These spacers may, as in the present construction, be formed by providing the rubber covering 15 of the running board with a plurality of integral ears or lugs 27 which are extended down upon the flange 19 to form solid insulating spacers between this flange and the splash pan 22.

The usual clamping bolts 28 which extend through the depending flange 19 and the splash pan 22, may also extend through the ears 27 so that the latter serve as insulating gaskets for the bolts as well as spacers for determining the width of the insulating air space 25. If necessary or desired, the connecting bolts 28 may be further insulated against metallic contact with the running board body by providing suitable insulating sleeves 29, of rubber or the like, which extend through the flange 19 of the running board as shown in Fig. 3.

It may be desirable to provide a closing means for the insulating air space 25 so as to improve the appearance of the running board and also to prevent water, dust or other foreign matter, which is thrown up from the road, from passing through the air space and dropping on the top of the running board. I provide such a closure in this instance by extending the inner edge of the rubber covering beyond the inner edge of the metal body and into substantial meeting relation with the splash pan. This extended edge of the rubber covering forms an overhanging longitudinal strip portion 30 which overlies the air space and to which the ears 27 are connected. If desired, this overhanging strip portion 30 of the rubber covering may be extended for a short distance downwardly into the air space between the depending ears 27.

In Fig. 4 of the drawing I have shown the connection between an end flange 18 of the running board body and the flanges 32 of the rear fender 21. Another connection substantially identical with the connection of Fig. 4 is provided between the other end flange 18 of the running board body and the flange of the front fender 20.

The connections provided at these points between the end flanges 18 of the running board and the fenders are similar to the connection, above described, between the rear flange 19 of the running board and the splash pan 22. In other words, integral lugs or ears 33 are provided on the rubber running board cover 15 and extend downwardly on the flanges 18 to serve as spacers for providing the insulating air spaces between the running board flanges and the fender flanges. Clamping bolts 34, similar to the bolts 28, extend through the running board and fender flanges and through the ears 33 of the rubber covering. Additional insulating sleeves 35, of rubber or other suitable material, may be provided on these bolts to extend through the running board flanges 18, as shown in Fig. 4. Extensions of the rubber covering form overhanging strip portions 36, which are continuations of the strip portion 30, and which overlie the insulating air spaces at the ends of the running board body.

The metal clips 23 mentioned above as being provided on the underside of the running board body, may be insulated from the supporting brackets 24 by a suitable gasket 36 disposed between the clip and the bracket. The usual connecting bolts 37 which extend through the sides of the clip and the sides of the bracket may be insulated from the clip by suitable insulating rubber bushings 38 through which the bolts extend as shown in Fig. 5.

From the foregoing description and accompanying drawing it will now be understood that I have provided a novel insulating arrangement for a metallic vehicle part being used as a radio antenna, such as the metal body of a vehicle running board. By my novel arrangement, an insulating air space is provided between the flanges of the running board and the adjacent vehicle structure, and the width of this air space is determined and maintained by extended portions of the rubber running board cover which form spacers. It will also be seen that an extended portion of the rubber covering overlies the insulating air space to improve the appearance of the running board and to prevent foreign matter from being thrown up from the road through the air space.

In the specification and claims I have referred to the covering or tread of the running board as being of "rubber" and it should be understood that I intend this term to include any or all of the various substances which have rubber-like characteristics.

While I have illustrated and described the improved radio antenna and novel insulating arrangement of my invention in a detailed manner, it should be understood, however, that I do not wish to be limited to the precise details of construction and arrangement of parts illustrated and described, but regard my invention as including such changes and modifications as do not involve a departure from the spirit of the invention and the scope of the appended claims.

Having thus described my invention I claim:

1. A vehicle having an antenna, said antenna being a metal part of the vehicle structure, said part of the vehicle structure being connected with but insulated from adjoining metal parts of the structure, portions of the insulation being relatively solid insulating material intervening at points between the connected metal parts and the other portions of the insulation being intervening air spaces.

2. A vehicle having a running board comprising a metal body, and insulating means between the running board and substantially coextending adjoining metal parts of the vehicle, said insulating means being in part a solid insulation and in part air space.

3. A vehicle having a running board comprising a metal body connected with the vehicle at a plurality of points but insulated from adjoining metal parts of the vehicle, the insulation comprising in part solid insulation at said points of connection and in part air spaces between other substantially coextending portions of the running board and the adjoining metal vehicle parts.

4. A vehicle having a running board provided with a metal body and a rubber tread connected to the metal body, the metal body of the running board being insulated from adjoining substantially coextending metal parts of the vehicle by insulation comprising in part portions of said rubber tread and in part air space.

5. A vehicle having a running board comprising a metal body and a rubber tread connected with the metal body, said metal body having a flange connected with adjoining metal parts of the vehicle, said rubber tread having spaced portions extended between said flange and said adjoining metal parts as spacers to provide insulating air spaces therebetween.

6. A vehicle having a running board comprising a metal body and a rubber tread connected with the metal body, said metal body having a flange connected with adjoining metal parts of the vehicle, said rubber tread having spaced portions extended between said flange and said adjoining metal parts as spacers to provide insulating air spaces therebetween and also having an edge extended to overlie said air spaces.

7. A running board comprising a metal body, and a rubber tread connected thereto, said metal body having a flange adapted for connection with a vehicle and said rubber tread having spaced portions thereof extended onto said flange and adapted to form insulating spacers between said flange and adjoining metal parts of the vehicle.

8. A running board comprising a metal body having a flange for connection with a vehicle, and a rubber tread connected with said metal body and having spaced portions extended onto said flange adapted to cooperate with adjoining metal parts of the vehicle to provide insulating air spaces between said flange and said adjoining metal parts, said rubber tread also having an edge thereof extended to overlie said air spaces.

9. A vehicle having running board supporting brackets and a running board comprising a metal body, means insulating said metal body from said brackets, and other insulating means between said metal body and adjacent metal parts of the vehicle, the last mentioned insulating means being in part a solid insulation and in part air space.

10. A vehicle having running board supporting brackets and a running board comprising a metal body and a rubber tread, and means insulating said metal body from said brackets, the metal body of the running board being insulated from other adjoining metal parts of the vehicle by insulation comprising in part portions of said rubber tread and in pair air space.

GEORGE N. EDWARDS.